United States Patent
Kanenari

(10) Patent No.: US 11,488,098 B2
(45) Date of Patent: Nov. 1, 2022

(54) EXPIRATION DATE NOTIFICATION METHOD FOR PUNCTURE REPAIR LIQUID

(71) Applicant: The Yokohama Rubber Co., LTD., Tokyo (JP)

(72) Inventor: Daisuke Kanenari, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 570 days.

(21) Appl. No.: 16/493,281

(22) PCT Filed: Jan. 22, 2018

(86) PCT No.: PCT/JP2018/001826
§ 371 (c)(1),
(2) Date: Sep. 11, 2019

(87) PCT Pub. No.: WO2018/179720
PCT Pub. Date: Oct. 4, 2018

(65) Prior Publication Data
US 2020/0134546 A1 Apr. 30, 2020

(30) Foreign Application Priority Data
Mar. 27, 2017 (JP) .............................. JP2017-061771

(51) Int. Cl.
*G06Q 10/08* (2012.01)
*F03B 11/06* (2006.01)
(Continued)

(52) U.S. Cl.
CPC ............ *G06Q 10/087* (2013.01); *B29C 73/02* (2013.01); *B29C 73/24* (2013.01); *B60S 5/00* (2013.01)

(58) Field of Classification Search
CPC .. G06Q 10/087; G06Q 10/00; G06Q 10/1091; B29C 73/02; B29C 73/24; B29C 73/163; B60S 5/00
(Continued)

(56) References Cited

U.S. PATENT DOCUMENTS

2014/0209207 A1 7/2014 Spindler et al.
2015/0110605 A1* 4/2015 Long .................... F03B 11/06
415/122.1
(Continued)

FOREIGN PATENT DOCUMENTS

JP 2003-040090 2/2003
JP 2006-347341 12/2006
(Continued)

OTHER PUBLICATIONS

International Search Report for International Application No. PCT/JP2018/001826 dated Apr. 17, 2018, 4 pages, Japan.

*Primary Examiner* — Garcia Ade
(74) *Attorney, Agent, or Firm* — Thorpe North & Western

(57) ABSTRACT

An expiration date notification method uses an information terminal device that comprises a storage unit that stores an expiration date of a puncture repair liquid contained in a container; a notification condition setting unit that sets a notification period and a notification method for notifying of a replacement period of the puncture repair liquid based on the expiration date stored in the storage unit; a notifying unit that notifies of the replacement period of the puncture repair liquid; and a control unit that controls the notifying unit based on settings of the notification condition setting unit, the method comprising: after the expiration date is input into the storage unit of the information terminal device, the information terminal device notifying of the replacement period of the puncture repair liquid within a preset notifi-
(Continued)

cation period including before and after the expiration date of the puncture repair liquid via a preset notification method.

12 Claims, 4 Drawing Sheets

(51) Int. Cl.
  *B29C 73/02* (2006.01)
  *B29C 73/24* (2006.01)
  *B60S 5/00* (2006.01)
(58) Field of Classification Search
  USPC .......................................................... 705/29
  See application file for complete search history.

(56) References Cited

U.S. PATENT DOCUMENTS

2016/0176129 A1    6/2016  Spindler et al.
2017/0209207 A1*   7/2017  Devries .............. A61B 18/1477

FOREIGN PATENT DOCUMENTS

| | | |
|---|---|---|
| JP | 2008-243018 | 10/2008 |
| JP | 2010 120250 | 6/2010 |
| JP | 2013-082137 | 5/2013 |
| JP | 2013-136176 | 7/2013 |
| JP | 2015-208166 | 11/2015 |
| JP | 2016-510269 | 4/2016 |
| WO | WO 2014/117098 | 7/2014 |

\* cited by examiner

EXPIRATION DATE NOTIFICATION METHOD FOR PUNCTURE REPAIR LIQUID

TECHNICAL FIELD

The present technology relates to a method of notifying of an expiration date of a puncture repair liquid installed in a vehicle and particularly relates to an expiration date notification method for a puncture repair liquid for reliably notifying users of an expiration date of a puncture repair liquid that also enables repair work of a punctured tire to be performed smoothly.

BACKGROUND ART

In recent years, when a tire mounted on a vehicle has punctured, a puncture repair fluid is injected into the tire via a tire valve to temporarily repair the puncture, while, at the same time, inflating the tire with air (refer to, for example, Japan Unexamined Patent Publication Nos. 2010-120250, 2013-82137, and 2013-136176).

Devices for injecting such a puncture repair liquid can be broadly separated into hand squeeze types and pressurized delivery types. With the hand squeeze type, the puncture repair liquid is contained in a flexible container, and the puncture repair liquid is injected into a tire by squeezing the container by hand. Meanwhile, with the pressurized delivery type, the puncture repair liquid is contained in a pressure resistant container, and the puncture repair liquid is injected into a tire by utilizing compressed air supplied from a compressor for filling the tire air pressure. In both cases, the puncture repair liquid is installed in the vehicle for an extended period of time housed in the container.

The puncture repair liquid includes an active ingredient such as latex and functions to fill the puncture hole by being injected into the tire. While the puncture repair liquid can be used for an extended period of time, the puncture repair liquid does have an expiration date. When the expiration date is reached, the active ingredient may coagulate or other such problems may occur. In such cases, there is a concern that the repair work cannot be performed smoothly when the tire is punctured. However, since the puncture repair liquid installed in the vehicle has long expiration date, the user in effect does not keep track of the expiration date.

SUMMARY

The present technology provides an expiration date notification method for a puncture repair liquid for reliably notifying users of an expiration date of a puncture repair liquid that also enables repair work of a punctured tire to be performed smoothly.

An expiration date notification method (first method) for a puncture repair liquid according to an embodiment of the present technology uses an information terminal device that includes
 a storage unit that stores an expiration date of a puncture repair liquid contained in a container;
 a notification condition setting unit that sets a notification period and a notification method for notifying of a replacement period of the puncture repair liquid based on the expiration date stored in the storage unit;
 a notifying unit that notifies of the replacement period of the puncture repair liquid; and
 a control unit that controls the notifying unit based on settings of the notification condition setting unit, the expiration date notification method including:
 after the expiration date is input into the storage unit of the information terminal device, the information terminal device notifying of the replacement period of the puncture repair liquid within a preset notification period including before and after the expiration date of the puncture repair liquid via a preset notification method.

An expiration date notification method (second method) for a puncture repair liquid according to an embodiment of the present technology uses
 a management server including
  a database in which personal information of a user of a vehicle installed with a puncture repair liquid and an expiration date of the puncture repair liquid are associated together and stored;
  a notification condition setting unit that sets a notification period and a notification method for notifying of a replacement period of the puncture repair liquid based on the expiration date stored in the database;
  a notifying unit that notifies of the replacement period of the puncture repair liquid; and
  a control unit that controls the notifying unit to notify a user in the database that is a notification target based on settings of the notification condition setting unit; and
 an information terminal device of a user that is connected to a management server via a communication network, the expiration date notification method including:
 after the expiration date is input into a storage unit of the management server, the management server notifying the information terminal device of the user of the replacement period of the puncture repair liquid within a preset notification period including before and after the expiration date of the puncture repair liquid via a preset notification method.

According to the first method of the present technology, by using the information terminal device of the user of the vehicle installed with the puncture repair liquid to notify of the replacement period of the puncture repair liquid within a preset notification period including before and after the expiration date of the puncture repair liquid via a preset notification method, the users can be reliably notified of the expiration date of the puncture repair liquid. As a result, the user can appropriately replace the puncture repair liquid, and the puncture repair liquid can be kept in a good state. This enables the repair work of a punctured tire to be performed smoothly.

In the first method, preferably, the notification method comprises at least one selected from email, a reminder function of an electronic calendar, or a social network service. By such notification methods, the users can be reliably notified of the expiration date of the puncture repair liquid.

In the first method, preferably, the expiration date is input into the storage unit of the information terminal device via an optical reading device. By using an optical reading device, the expiration date may be easily and accurately input.

In the first method, preferably, a notification from the notifying unit comprises order information for a replacement puncture repair liquid. Utilizing order information allows a replacement puncture repair liquid to be easily ordered.

In the first method, preferably, the notification condition setting unit sets a new notification period based on an updated expiration date. By the notification condition setting unit setting the new notification period based on the updated expiration date, the notifications from the notifying unit up until this point in time can be removed.

According to the second method of the present technology, by using the management server and the information terminal device of the user of the vehicle installed with the puncture repair liquid to notify the information terminal device of the user of the replacement period of the puncture repair liquid within a preset notification period including before and after the expiration date of the puncture repair liquid via a preset notification method, the users can be reliably notified of the expiration date of the puncture repair liquid. As a result, the user can appropriately replace the puncture repair liquid, and the puncture repair liquid can be kept in a good state. This enables the repair work of a punctured tire to be performed smoothly.

In the second method, preferably, the notification method comprises at least one selected from email or a social network service. By such notification methods, the users can be reliably notified of the expiration date of the puncture repair liquid.

In the second method, preferably, the expiration date is input into the database of the management server via an optical reading device. By using an optical reading device, the expiration date may be easily and accurately input.

In the second method, preferably, a notification from the notifying unit comprises order information for a replacement puncture repair liquid. Utilizing order information allows a replacement puncture repair liquid to be easily ordered.

In the second method, preferably, the notification condition setting unit sets a new notification period based on an updated expiration date. By the notification condition setting unit setting the new notification period based on the updated expiration date, the notifications from the notifying unit up until this point in time can be removed.

DETAILED DESCRIPTION

Figure 1:
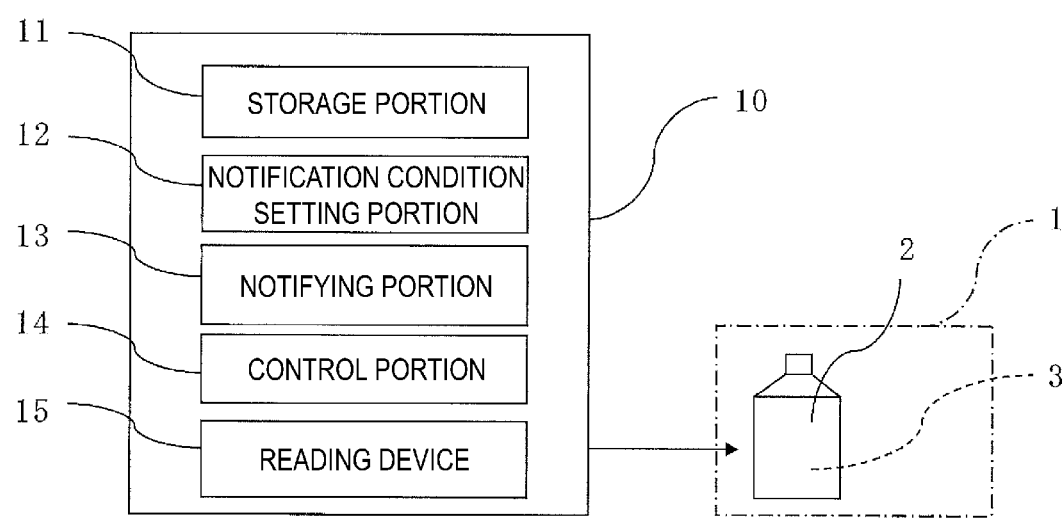
FIG. 1 is a configuration diagram illustrating a device for an expiration date notification method (first method) for a puncture repair liquid according to an embodiment of the present technology.

Configurations of embodiments of the present technology are described in detail below with reference to the accompanying drawings. FIG. 1 is a diagram illustrating an expiration date notification method (first method) for a puncture repair liquid according to an embodiment of the present technology.

As illustrated in FIG. 1, an information terminal device 10 is a device for notifying of an expiration date of a puncture repair liquid 3 contained in a container 2 of a puncture repair kit installed in a vehicle 1. A smartphone or the like on which an application for expiration date management is installed can be used as the information terminal device 10.

The information terminal device 10 includes a storage portion 11 (storage unit) that stores the expiration date of the puncture repair liquid 3, a notification condition setting portion 12 (notification condition setting unit) that sets the notification period and notification method for notifying of a replacement period of the puncture repair liquid 3 based on the expiration date stored in the storage portion 11, a notifying portion 13 (notifying unit) that notifies of the replacement period of the puncture repair liquid 3, and a control portion 14 (control unit) that controls the notifying portion 13 based on the settings of the notification condition setting portion 12. The information terminal device 10 includes, as necessary, an optical reading device 15 that reads the expiration date of the puncture repair liquid 3 on the container 2.

The storage portion 11 is constituted by a storage device such as a memory or a hard disk and stores the expiration date of the puncture repair liquid 3 input from an external portion. The expiration date is registered as an expiration date or the period of time until the expiration date. The expiration date does not necessarily include the day, and only the year and month can be stored. As the period of time until the expiration date, the length of time, for example, "5 years" or "7 years", can be stored. Such an expiration date can be updated.

The notification condition setting portion 12 is configured to set the notification period and notification method based on the expiration date stored in the storage portion 11 and to perform this function via a computer program. The notification period can be set for any period of time based on the expiration date. For example, the notification period can be two months from one month before the expiration date to one month after the expiration date, 120 days from 60 days before the expiration date to 60 days after the expiration date, and the like. Examples of the notification method include email, the reminder function of an electronic calendar, and social network services (SNS).

The notifying portion 13 is configured to notify of the replacement period of the puncture repair liquid 3 and to perform this function via a computer program. Specific examples of how notification is performed include sending an email to the personal account of the user, activating the reminder function of an electronic calendar, and sending a notification to the personal account of the user of a social network service. However, the information relating to the replacement period of the puncture repair liquid 3 can also be displayed on the information terminal device 10.

The control portion 14 is configured to control the notifying portion 13 based on the settings of the notification condition setting portion 12 and to perform this function via a computer program. In other words, the control portion 14 determines whether the current date is within the notification period and, in the case of the current date being within the notification period, sends an instruction to the notifying portion 13 to notify of the replacement period of the puncture repair liquid 3 via a predetermined method.

The reading device 15 is configured to read the expiration date on the container 2 of the puncture repair liquid 3. Specifically, the reading device 15 is an optical reading device such as an optical character reader (OCR), a 1-D barcode reader, and a 2-D barcode reader. For example, reading an expiration date composed of numbers on the container 2 of the puncture repair liquid 3 with an OCR or reading an expiration date composed of a barcode with a barcode reader simplifies how the details are input and prevents mistakes being made. The expiration date of the puncture repair liquid 3 read by the reading device 15 is input into the storage portion 11 of the information terminal device 10.

Note that an input device including a key pad can be used instead of the reading device 15 to input the expiration date of the puncture repair liquid 3 into the storage portion 11 of the information terminal device 10.

Figure 2:
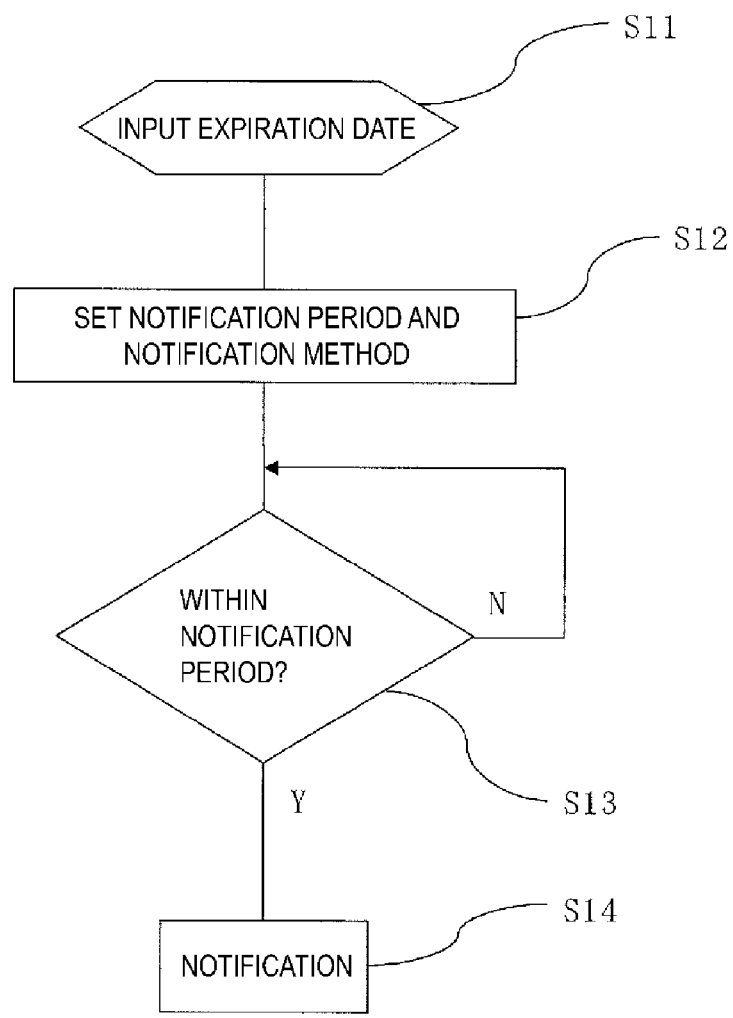
FIG. 2 is a flowchart illustrating the expiration date notification method (first method) for a puncture repair liquid according to an embodiment of the present technology.

FIG. 2 is a flowchart illustrating the expiration date notification method (first method) for a puncture repair liquid according to an embodiment of the present technology. In the case that the user of the vehicle 1 installed with the puncture repair liquid 3 wants to be notified of the expiration date of the puncture repair liquid 3 via the information terminal device 10 described above, as illustrated in FIG. 2, the user first inputs the expiration date of the puncture repair liquid 3 into the storage portion 11 of the information terminal device 10 (step S11). This input operation may be performed by the user at the time of purchase of the vehicle 1 or may be performed by a salesperson of a car dealership. Additionally, the input operation can be performed simply by using the reading device 15.

In an on state of the information terminal device 10, the notification condition setting portion 12 sets the notification period and notification method for notifying of the replacement period of the puncture repair liquid 3 based on the expiration date stored in the storage portion 11 (step S12). Then, the control portion 14 determines whether the current date is within the notification period set in the notification condition setting portion 12 and, in the case of the current date being within the notification period, sends an instruction to the notifying portion 13 to notify of the replacement period of the puncture repair liquid 3 (step S13). In this way, the notifying portion 13 notifies of the replacement period of the puncture repair liquid 3 via the preset notification method (step S14).

According to the expiration date notification method described above, by using the information terminal device 10 of the user of the vehicle 1 installed with the puncture repair liquid 3 to notify of the replacement period of the puncture repair liquid 3 within a preset notification period including before and after the expiration date of the puncture repair liquid 3 via a preset notification method, the users can be reliably notified of the expiration date of the puncture repair liquid 3. As a result, the user of the vehicle 1 can appropriately replace the puncture repair liquid 3 approximately within the replacement period, and the puncture repair liquid 3 can be kept in a good state. Thus, when a tire of the vehicle 1 is punctured, the puncture repair liquid 3 in a good state can be used and the repair work can be performed smoothly.

In particular, by using email, the reminder function of an electronic calendar, and social network services used often in daily life as the notification method, the users can be reliably notified of the expiration date of the puncture repair liquid 3. Also, the order information of the replacement puncture repair liquid is preferably included in the notification via the notification method. Here, the order information is information for ordering a replacement puncture repair liquid and includes, for example, an Internet address (URL (Uniform Resource Locator)) of a shopping site where replacement puncture repair liquid can be purchased, or an Internet address of a site including an order form for a vehicle dealership. Guiding the user to these sites allows a replacement puncture repair liquid to be easily ordered.

The notification condition setting portion 12 sets a new notification period based on the updated expiration date. Thus, after the puncture repair liquid 3 is replaced, the new expiration date is input into the storage portion 11. Then, the notification condition setting portion 12 sets the new notification period based on the updated expiration date, and the notifications from the notifying portion 13 up until this point in time are removed. Then, the expiration date management continues based on the new expiration date.

Figure 3:
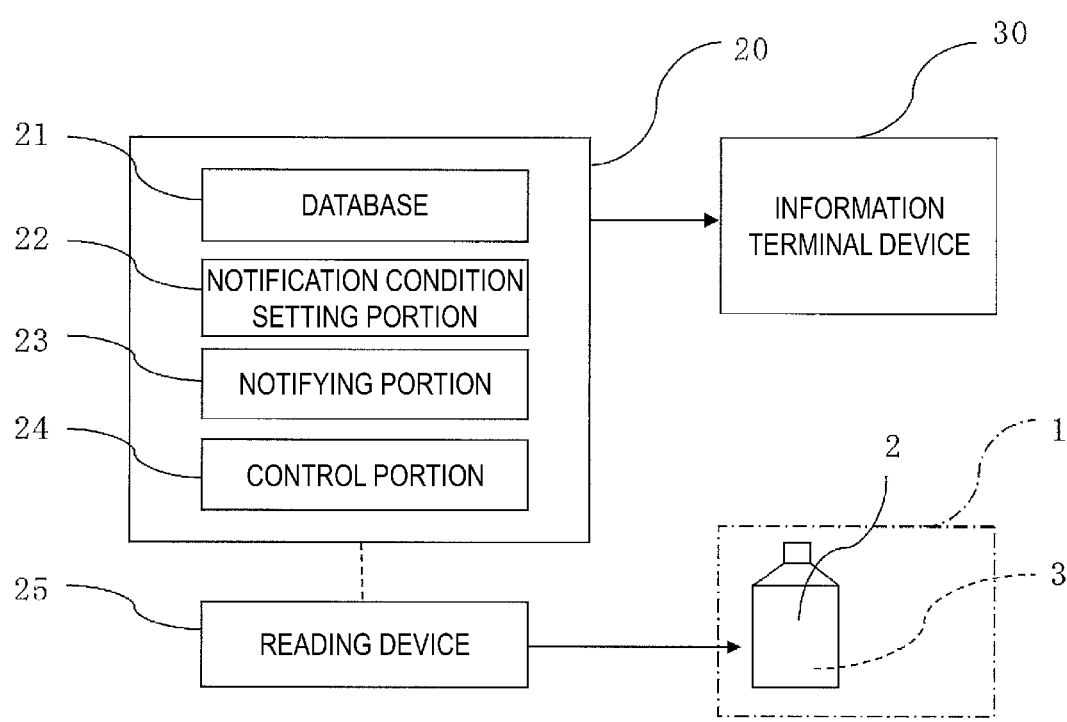
FIG. 3 is a configuration diagram illustrating a device for an expiration date notification method (second method) for a puncture repair liquid according to an embodiment of the present technology.

FIG. 3 is a diagram illustrating an expiration date notification method (second method) for a puncture repair liquid according to an embodiment of the present technology. As illustrated in FIG. 3, a management server 20 is a device for notifying of an expiration date of the puncture repair liquid 3 contained in the container 2 of a puncture repair kit installed in the vehicle 1 via an information terminal device 30 of the user of the vehicle 1. A computer or the like on which an application for expiration date management is installed can be used as the management server 20. A smartphone or the like can be used as the information terminal device 30.

The management server 20 includes a database 21 in which the personal information of the user of the vehicle 1 installed with the puncture repair liquid 3 and the expiration date of the puncture repair liquid 3 are associated together and stored, a notification condition setting portion 22 (notification condition setting unit) that sets the notification period and notification method for notifying of a replacement period of the puncture repair liquid 3 based on the expiration date stored in the database 21, a notifying portion 23 (notifying unit) that notifies of the replacement period of the puncture repair liquid 3, and a control portion 24 (control unit) that controls the notifying portion 23 to notify a user in the database 21 that is a notification target based on the settings of the notification condition setting portion 22. The management server 20 includes, as necessary, an optical reading device 25 that reads the expiration date of the puncture repair liquid 3 on the container 2. The information terminal device 30 of the user is connectable to the management server 20 via a communication network such as the Internet and is capable of receiving notifications from the notifying portion 23 of the management server 20.

The database 21 is constituted by a storage device such as a memory or a hard disk and stores the personal information of the user of the vehicle 1 and the expiration date of the puncture repair liquid 3 input from an external portion. Personal information may include name, address, phone number, vehicle information, email address, personal account for a social network service (SNS), and the like and may be at least one of these. For example, only the name and email address may be used. The expiration date is registered as an expiration date or the period of time until the expiration date. The expiration date does not necessarily include the day, and only the year and month can be stored. As the period of time until the expiration date, the length of time, for example, "5 years" or "7 years", can be stored. Such an expiration date can be updated.

The notification condition setting portion 22 is configured to set the notification period and notification method based on the expiration date stored in the database 21 and to perform this function via a computer program. The notification period can be set for any period of time based on the expiration date. For example, the notification period can be two months from one month before the expiration date to one month after the expiration date, 120 days from 60 days before the expiration date to 60 days after the expiration date, and the like. Examples of the notification method include email and social network services.

The notifying portion 23 is configured to notify of the replacement period of the puncture repair liquid 3 and to perform this function via a computer program. Specific examples of how notification is performed include sending an email to the personal account of the user and sending a notification to the personal account of the user of a social network service.

The control portion 24 is configured to control the notifying portion 23 based on the settings of the notification condition setting portion 22 and to perform this function via a computer program. In other words, the control portion 24 determines about a discretionary expiration date whether the current date is within the notification period and, in the case of the current date being within the notification period, sends an instruction to the notifying portion 13 to notify of the replacement period of the puncture repair liquid 3 via a predetermined method. At this time, the control portion 24 extracts a specific user associated with the expiration date within the notification period from the database 21 and notifies only this user as the notification target.

The reading device 25 is configured to read the expiration date on the container 2 of the puncture repair liquid 3. Specifically, the reading device 25 is an optical reading device such as an optical character reader (OCR), a 1-D barcode reader, and a 2-D barcode reader. For example, reading an expiration date composed of numbers on the container 2 of the puncture repair liquid 3 with an OCR or reading an expiration date composed of a barcode with a barcode reader simplifies how the details are input and prevents mistakes being made. The expiration date of the puncture repair liquid 3 read by the reading device 25 is input into the database 21 of the management server 20.

Note that an input device including a key pad or a computer keyboard can be used instead of the reading device 25 to input the expiration date of the puncture repair liquid 3 into the database 21 of the management server 20.

Figure 4:
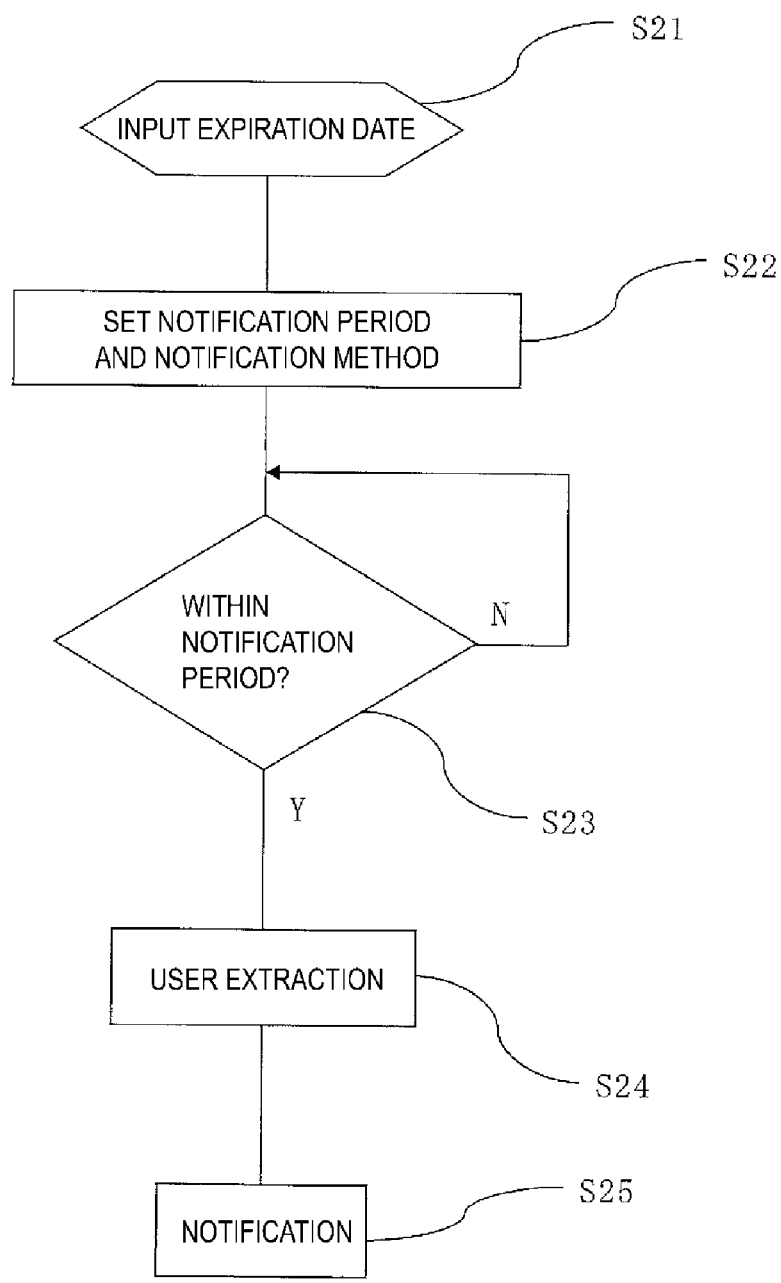
FIG. 4 is a flowchart illustrating the expiration date notification method (second method) for a puncture repair liquid according to an embodiment of the present technology.

FIG. 4 is a flowchart illustrating the expiration date notification method (second method) for a puncture repair liquid according to an embodiment of the present technology. In the case that the user of the vehicle 1 installed with the puncture repair liquid 3 wants to be notified of the expiration date of the puncture repair liquid 3 via the management server 20 and the information terminal device 30 described above, as illustrated in FIG. 4, the administrator of the car maker or car dealership, for example, inputs the expiration date of the puncture repair liquid 3 into the database 21 of the management server 20 (step S21). Such an input operation can be performed when the user is determined, such as when the vehicle 1 is purchased. Additionally, the input operation can be performed simply by using the reading device 25.

In an on state of the management server 20, the notification condition setting portion 22 sets the notification period and notification method for notifying of the replacement period of the puncture repair liquid 3 based on the expiration date stored in the database 21 (step S22). Then, the control portion 24 determines about a discretionary expiration date whether the current date is within the notification period set in the notification condition setting portion 22 and, in the case of the current date being within the notification period, sends an instruction to the notifying portion 23 to notify of the replacement period of the puncture repair liquid 3 (step S23). At this time, the control portion 24 extracts a specific user associated with the expiration date within the notification period from the database 21 (step S24). In this way, the notifying portion 23 notifies the information terminal device 30 of the user corresponding to the notification target in the database 21 of the replacement period of the puncture repair liquid 3 via the preset notification method (step S25).

According to the expiration date notification method described above, by using the management server 20 and the information terminal device 30 of the user of the vehicle 1 installed with the puncture repair liquid 3 to notify of the replacement period of the puncture repair liquid 3 within a preset notification period including before and after the expiration date of the puncture repair liquid 3 via a preset notification method, the users can be reliably notified of the expiration date of the puncture repair liquid 3. As a result, the user of the vehicle 1 can appropriately replace the puncture repair liquid 3 approximately within the replacement period, and the puncture repair liquid 3 can be kept in a good state. Thus, when a tire of the vehicle 1 is punctured, the puncture repair liquid 3 in a good state can be used and the repair work can be performed smoothly.

In particular, by using email and social network services used often in daily life as the notification method, the users can be reliably notified of the expiration date of the puncture repair liquid 3. Also, the order information of the replacement puncture repair liquid is preferably included in the notification via the notification method. Here, the order information is information for ordering a replacement puncture repair liquid and includes, for example, an Internet address of a site including an order form for a car dealership or parts shop. In particular, the order form is preferably configured such that by pressing the order button, the order is automatically sent to a car dealership or parts shop. Guiding the user to these sites allows a replacement puncture repair liquid to be easily ordered. Note that, in addition to electronic means such as email, the notification method can include notification via direct mail (post) or phone.

The notification condition setting portion 22 sets a new notification period based on the updated expiration date. Thus, after the puncture repair liquid 3 is replaced, the new expiration date is input into the database 21. Then, the notification condition setting portion 22 sets the new notification period based on the updated expiration date, and the notifications from the notifying portion 23 up until this point in time are removed. Then, the expiration date management continues based on the new expiration date. Such an update operation can be performed as part of the service the car dealership provides when selling the replacement puncture repair liquid.

The invention claimed is:

1. An expiration date notification method for a puncture repair liquid using an information terminal device that comprises:

a storage unit that stores an expiration date of a puncture repair liquid contained in a container;

a notification condition setting unit that sets a notification period and a notification method for notifying of a replacement period of the puncture repair liquid based on the expiration date stored in the storage unit;

a notifying unit that notifies of the replacement period of the puncture repair liquid; and a control unit that controls the notifying unit based on settings of the notification condition setting unit, the expiration date notification method comprising:

after the expiration date is input into the storage unit of the information terminal device, the information terminal device notifying of the replacement period of the puncture repair liquid within a preset notification period including before and after the expiration date of the puncture repair liquid via a preset notification method;

wherein the expiration date is input into the storage unit of the information terminal device via an optical reading device.

2. The expiration date notification method for a puncture repair liquid according to claim 1, wherein the notification method comprises at least one selected from email, a reminder function of an electronic calendar, or a social network service.

3. The expiration date notification method for a puncture repair liquid according to claim 1, wherein a notification from the notifying unit comprises order information for a replacement puncture repair liquid.

4. The expiration date notification method for a puncture repair liquid according to claim 1, wherein the notification condition setting unit sets a new notification period based on an updated expiration date.

5. An expiration date notification method for a puncture repair liquid using
a management server comprising
 a database in which personal information of a user of a vehicle installed with a puncture repair liquid and an expiration date of the puncture repair liquid are associated together and stored;
 a notification condition setting unit that sets a notification period and a notification method for notifying of a replacement period of the puncture repair liquid based on the expiration date stored in the database;
 a notifying unit that notifies of the replacement period of the puncture repair liquid; and
 a control unit that controls the notifying unit to notify a user in the database that is a notification target based on settings of the notification condition setting unit; and
an information terminal device of a user that is connected to a management server via a communication network, the expiration date notification method comprising:
after the expiration date is input into a storage unit of the management server, the management server notifying the information terminal device of the user of the replacement period of the puncture repair liquid within a preset notification period including before and after the expiration date of the puncture repair liquid via a preset notification method;
wherein the expiration date is input into the database of the management server via an optical reading device.

6. The expiration date notification method for a puncture repair liquid according to claim 5, wherein the notification method comprises at least one selected from email or a social network service.

7. The expiration date notification method for a puncture repair liquid according to claim 5, wherein a notification from the notifying unit comprises order information for a replacement puncture repair liquid.

8. The expiration date notification method for a puncture repair liquid according to claim 5, wherein the notification condition setting unit sets a new notification period based on an updated expiration date.

9. The expiration date notification method for a puncture repair liquid according to claim 2, wherein a notification from the notifying unit comprises order information for a replacement puncture repair liquid.

10. The expiration date notification method for a puncture repair liquid according to claim 9, wherein the notification condition setting unit sets a new notification period based on an updated expiration date.

11. The expiration date notification method for a puncture repair liquid according to claim 6, wherein a notification from the notifying unit comprises order information for a replacement puncture repair liquid.

12. The expiration date notification method for a puncture repair liquid according to claim 11, wherein the notification condition setting unit sets a new notification period based on an updated expiration date.

* * * * *